United States Patent
Gressman et al.

(10) Patent No.: US 11,954,267 B2
(45) Date of Patent: Apr. 9, 2024

(54) IP KVM DEVICES

(71) Applicant: Hewlett-Packard Development Company, L.P., Spring, TX (US)

(72) Inventors: Eric John Gressman, Fort Collins, CO (US); Douglas A Reynolds, Fort Collins, CO (US); Peter Andrew Seiler, Fort Collins, CO (US); Byron A Alcorn, Fort Collins, CO (US); Gregory Mark Hughes, Fort Collins, CO (US); J. Michael Stahl, Fort Collins, CO (US); Patrick S Anderson, Fort Collins, CO (US); Joseph-Jonathan Salzano, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/249,145

(22) PCT Filed: Oct. 20, 2020

(86) PCT No.: PCT/US2020/056537
§ 371 (c)(1),
(2) Date: Apr. 14, 2023

(87) PCT Pub. No.: WO2022/086508
PCT Pub. Date: Apr. 28, 2022

(65) Prior Publication Data
US 2023/0393668 A1 Dec. 7, 2023

(51) Int. Cl.
*G06F 3/023* (2006.01)
*G06F 3/038* (2013.01)
*G06F 3/14* (2006.01)

(52) U.S. Cl.
CPC .............. *G06F 3/023* (2013.01); *G06F 3/038* (2013.01); *G06F 3/14* (2013.01); *G06F 2203/0383* (2013.01)

(58) Field of Classification Search
CPC . G06F 3/023; G06F 3/038; G06F 3/14; G06F 2203/0383
See application file for complete search history.

(56) References Cited

U.S. PATENT DOCUMENTS 8,015,332 B2  9/2011 Kobayashi
8,706,930 B2  4/2014 Fujita et al.
(Continued)

OTHER PUBLICATIONS

CS1922M_CS1924M (2-Port USB 3.0 4K DisplayPort MST KVMP™ Switch), www.aten.com/global/en/products/kvm/desktop-kvm-switches/cs1922m, Sep. 15, 2020, pp. 62.

*Primary Examiner* — Sejoon Ahn
(74) *Attorney, Agent, or Firm* — Knobbe, Martens, Olson & Bear, LLP

(57) ABSTRACT

One example of an internet protocol (IP) keyboard, video, mouse (KVM) device includes a universal serial bus, a display port, a network port, and a processor. The USB port is to be communicatively coupled to a host device. The display port is to be communicatively coupled to the host device. The network port is to be communicatively coupled to a network. The processor is communicatively coupled to the USB port, the display port, and the network port. The processor is to receive, via the display port, a multi-stream transport (MST) DisplayPort signal; demux the MST DisplayPort signal to provide a plurality of individual video streams; and output, via the network port, each individual video stream.

11 Claims, 7 Drawing Sheets

(56) References Cited

U.S. PATENT DOCUMENTS

| | | | |
|---|---|---|---|
| 9,164,930 B2 | 10/2015 | Zeng et al. | |
| 9,286,082 B1 | 3/2016 | Hobbs | |
| 2006/0215687 A1 | 9/2006 | Lee et al. | |
| 2009/0144766 A1* | 6/2009 | Jung | H04N 21/4437 |
| | | | 725/111 |
| 2009/0265488 A1 | 10/2009 | Birger | |
| 2012/0079162 A1 | 3/2012 | Jaramillo | |
| 2013/0050084 A1 | 2/2013 | Soffer | |
| 2019/0008124 A1* | 1/2019 | Komatsu | G06F 3/14 |
| 2019/0008359 A1* | 1/2019 | Ma | G02B 23/24 |
| 2019/0009172 A1* | 1/2019 | Sawai | G05G 1/58 |
| 2019/0011709 A1* | 1/2019 | Yadav | G06T 19/006 |
| 2021/0181832 A1* | 6/2021 | Ansari | G06F 13/4295 |
| 2021/0181863 A1* | 6/2021 | Gatson | G06F 1/1669 |
| 2021/0181910 A1* | 6/2021 | Brockmole | B60K 37/02 |
| 2021/0182919 A1* | 6/2021 | Wyckoff | B60L 53/51 |
| 2023/0251988 A1* | 8/2023 | Thien | G06F 13/4022 |
| | | | 710/316 |

\* cited by examiner

IP KVM DEVICES

BACKGROUND

Internet protocol (IP) keyboard, video, mouse (KVM) devices (e.g., dongles) may be used to enable a user to access a host device (e.g., server, workstation, computer, etc.) over a network. An IP KVM device may capture universal serial bus (USB) signals (e.g., keyboard signals, mouse signals, peripheral device signals, etc.) and video signals from the host device and encode them into packets for transmission over an ethernet link to a remote client device (e.g., computer). The remote client device may then decode the signals and output the video signals to a single display or multiple displays and use the USB signals for USB devices connected to the host device and/or the client device.

DETAILED DESCRIPTION

Figure 1:
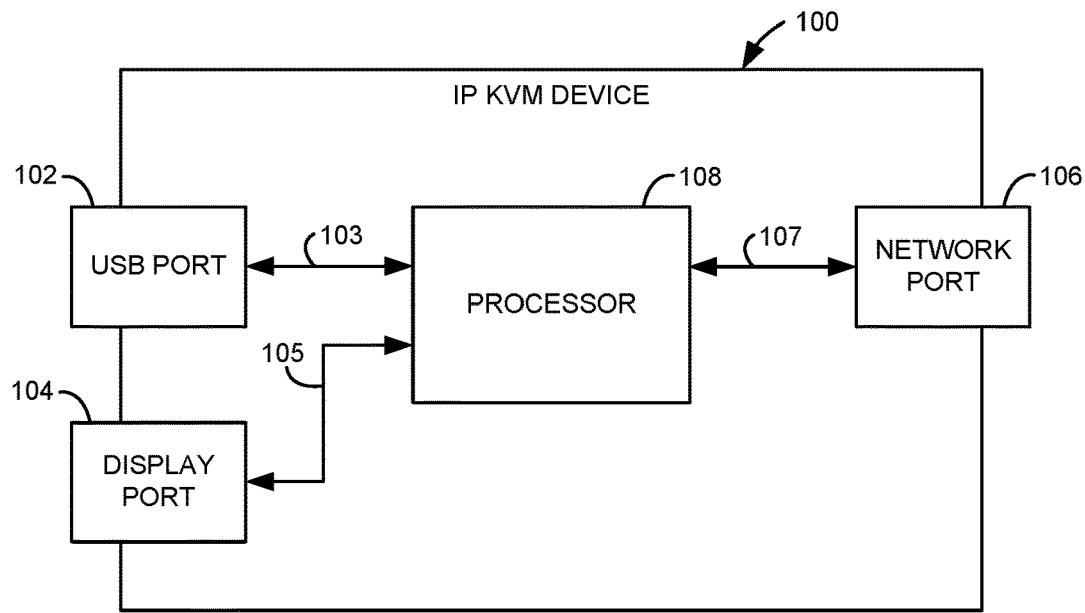
FIG. 1 is a block diagram illustrating one example of an internet protocol (IP) keyboard, video, mouse (KVM) device.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Internet protocol (IP) keyboard, video, mouse (KVM) devices enable a user to connect to remote host devices (e.g., computer systems). The IP KVM device is connected to the remote host device and captures and emulates the keyboard, video, and mouse devices. Some users may use multiple displays to perform their work efficiently. If those users desire to work on a computer system remotely using an IP KVM device, the users are limited to the number of displays the IP KVM device supports. Many IP KVM devices support one or two displays. Some IP KVM devices support DisplayPort, but do not support multi-stream transport (MST) capabilities of DisplayPort. With MST, the data for multiple displays may be sent across a single DisplayPort cable. An IP KVM device that supports DisplayPort MST would be capable of transmitting a single display signal or multiple display signals from a single DisplayPort input.

MST was introduced in the DisplayPort 1.2 standard. MST allows multiple independent displays to be driven from a single DisplayPort signal by multiplexing several video streams into a single stream. With DisplayPort 1.2 MST, up to five monitors with 1680×1050 (WSXGA) resolution, up to four monitors with 1920×1080 (1080P) or 1920×1200 resolution, up to two monitors with 2560×1600 (WQXGA) resolution, or one monitor with 3840×2160 (UltraHD, 4K) or 4096×2160 (4K×2K) resolution may be supported, where each monitor has a 60 frames per second refresh rate. For the DisplayPort 1.3, 1.4, and 2.0 specifications, even more display streams and higher resolution streams are possible.

Accordingly, as disclosed herein, an IP KVM device communicatively coupled between a host device and a network may include a processor to receive a multi-stream transport (MST) DisplayPort signal from the host device, demux the MST DisplayPort Signal, and output each individual video stream over the network. The processor may emulate multiple displays and receive the MST DisplayPort signal based on the emulated multiple displays. The multiple displays may be emulated based on display properties of physical displays connected to the client/receiver. By using an IP KVM device that supports DisplayPort MST, the user is able to use more displays and thus be more efficient compared to typical IP KVM devices that do not support DisplayPort MST. In addition, by using the IP KVM devices disclosed herein that support DisplayPort MST, the host device environment may be decluttered by eliminating the use of a MST hub and associated cables.

FIG. 1 is a block diagram illustrating one example of an internet protocol IP KVM device 100. IP KVM device 100 includes a universal serial bus (USB) port 102, a display port 104 (e.g., DisplayPort port), a network port 106 (e.g., ethernet port), and a processor 108. The processor 108 is communicatively coupled to the USB port 102 through a communication path 103, the display port 104 through a communication path 105, and the network port 106 through a communication path 107.

As will be described in more detail below with reference to FIG. 3, the USB port 102 may be communicatively coupled to a host device (not shown). The display port 104 may be communicatively coupled to the host device. The network port 106 may be communicatively coupled to a network (not shown). The processor 108 may include a central processing unit (CPU), microprocessor, and/or other suitable logic circuitry for controlling the operation of IP KVM device 100. Processor 108 may include a memory (not shown), which may store machine readable instructions (e.g., software and/or firmware) to be executed by processor 108 to control the operation of IP KVM device 100. The memory may include a random access memory (RAM), a read-only memory (ROM), or a combination thereof. In one example, the processor 108 implements the method 200 described below with reference to FIGS. 2A-2E to control the operation of IP KVM device 100.

Figure 2A:
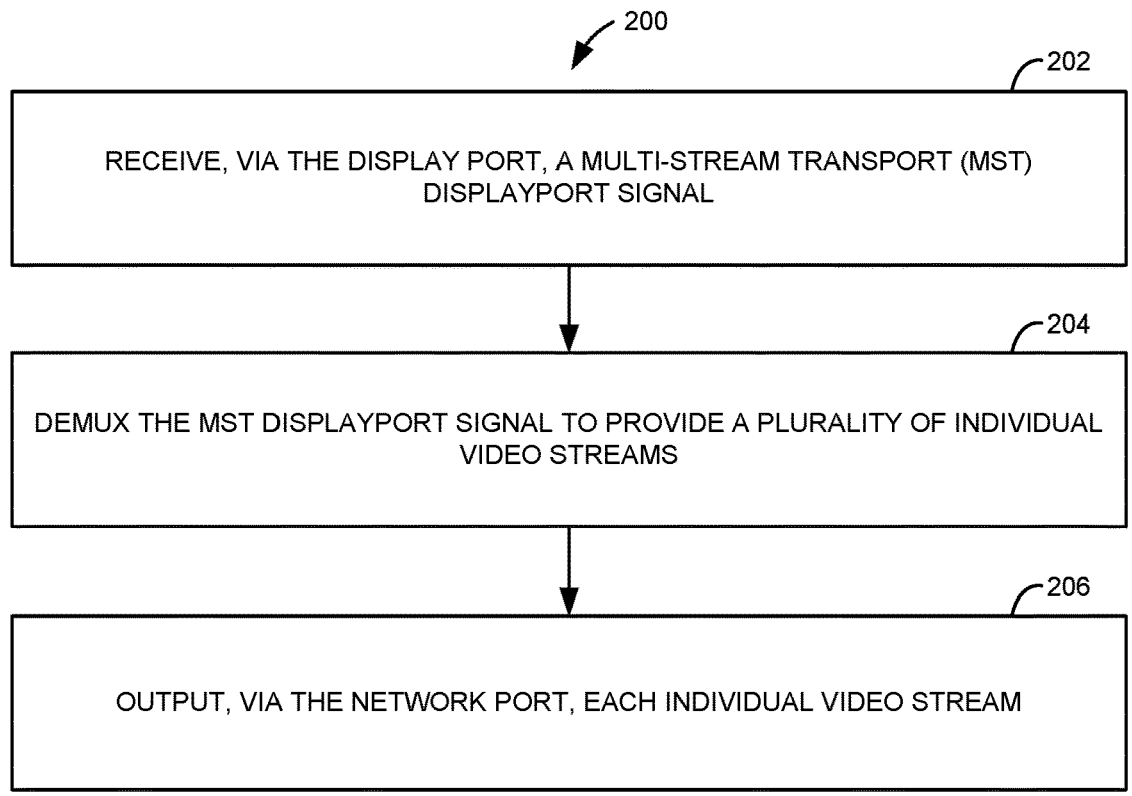
FIGS. 2A-2E are flow diagrams illustrating one example of a method for operating the IP KVM device of FIG. 1.
Figure 2B:
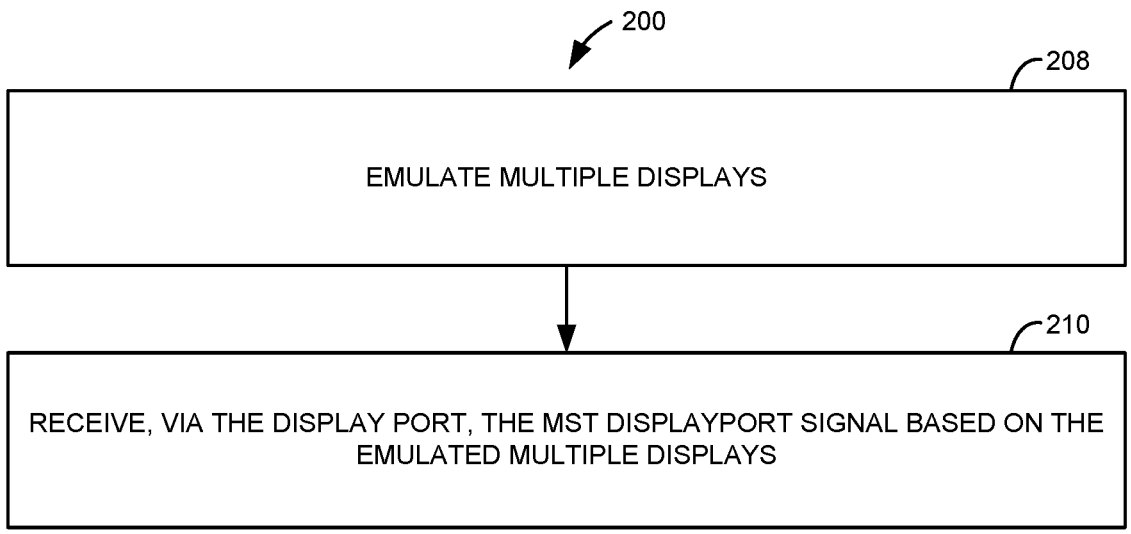

As illustrated in FIG. 2A at 202, processor 108 may receive, via the display port 104, a multi-stream transport (MST) DisplayPort signal. At 204, processor 108 may demux the MST DisplayPort signal to provide a plurality of individual video streams. At 206, processor 108 may output, via the network port 106, each individual video stream. As illustrated in FIG. 2B at 208, processor 108 may further emulate multiple displays. At 210, processor 108 may further receive, via the display port 104, the MST DisplayPort signal based on the emulated multiple displays.

Figure 2C:
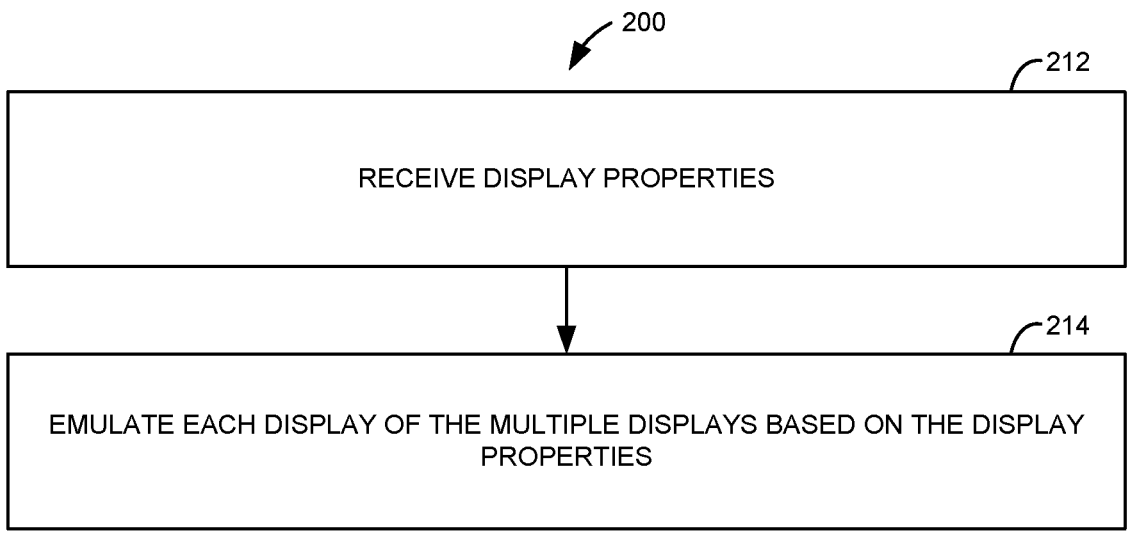

As illustrated in FIG. 2C at 212, processor 108 may further receive display properties. At 214, processor 108 may further emulate each display of the multiple displays based on the display properties. For example, a user may have two 1080P monitors at 60 Hz and one 1920×1200 resolution monitor at Hz. These three monitors would be difficult to support with a typical IP KVM device and would likely use multiple graphics interfaces to the IP KVM device, or even multiple IP KVM devices. With IP KVM device 100 described herein, a chain of these three monitors may be emulated to capture the exact resolutions and frame rates for the client/receiver to consume.

Figure 2D:
Figure 2E:
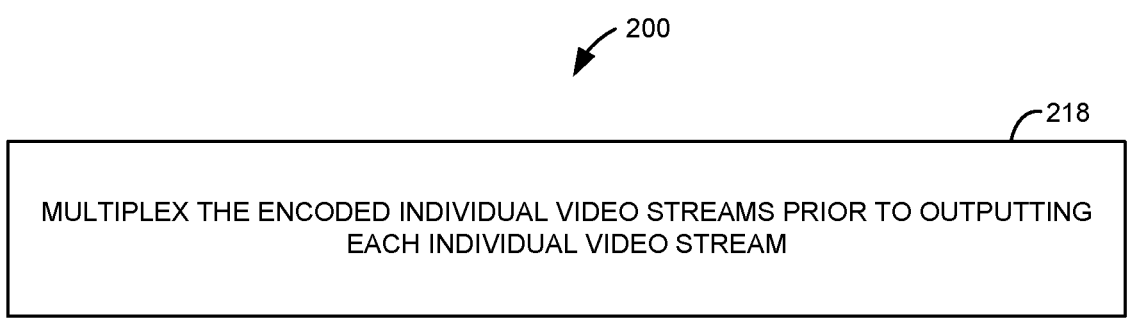

As illustrated in FIG. 2D at 216, processor 108 may further encode each individual video stream prior to outputting each individual video stream. In one example, each individual video stream may be transmitted to the client/receiver independently. In another example, as illustrated in FIG. 2E at 218, processor 108 may further multiplex the encoded individual video streams prior to outputting each individual video stream. In this case, the individual video streams are combined prior to transmission to the client/receiver. The outputted individual video streams (either independent or multiplexed) are then transmitted to a client/receiver, which decodes the individual video streams and outputs each decoded individual video stream to a corresponding physical display.

Figure 3:
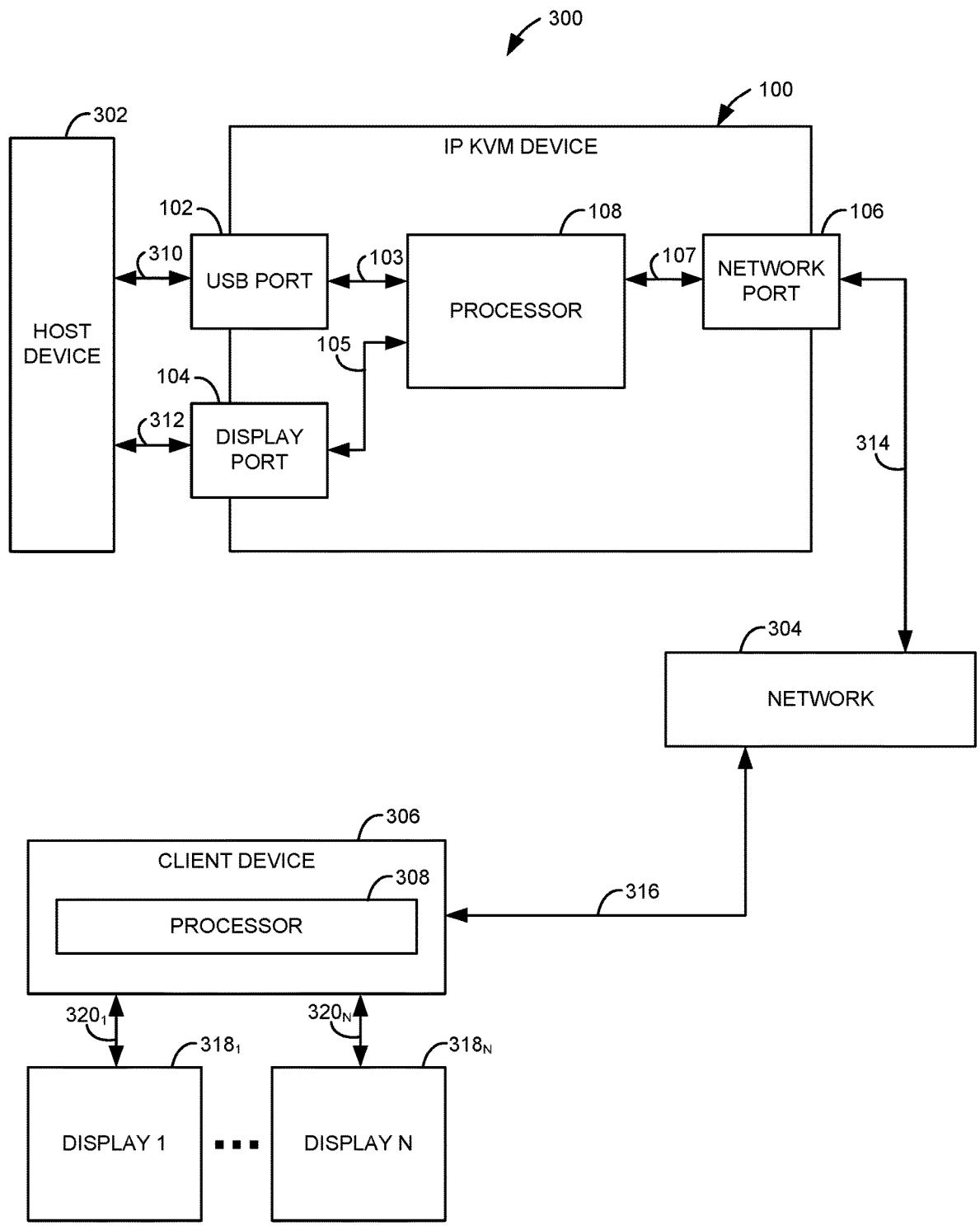
FIG. 3 is a block diagram illustrating one example of a system including an IP KVM device.

FIG. 3 is a block diagram illustrating one example of a system 300. System 300 includes an IP KVM device 100 as previously described and illustrated with reference to FIG. 1, a host device 302, a network 304, a client device 306, and a plurality of physical displays $318_1$ to $318_N$, where "N" is any suitable number of displays. The USB port 102 of IP KVM device 100 is communicatively coupled to the host device 302 through a communication path 310 to receive USB signals from the host device. The display port 104 of IP KVM device 100 is communicatively coupled to the host device 302 through a communication path 312 to receive display signals from the host device. The network port 106 of IP KVM device 100 is communicatively coupled to the network 304 through a communication path 314 to transmit USB signals and display signals over the network 304.

Client device 306 is communicatively coupled to network 304 through a communication path 316. Client device 306 includes a processor 308. Client device 306 is communicatively coupled to each of the plurality of displays $318_1$ to $318_N$ through a communication path $320_1$ to $320_N$, respectively. The processor 308 may include a CPU, microprocessor, and/or other suitable logic circuitry for controlling the operation of client device 306. Processor 308 may include a memory (not shown), which may store machine readable instructions (e.g., software and/or firmware) to be executed by processor 308 to control the operation of client device 306. The memory may include a RAM, a ROM, or a combination thereof. Processor 308 may receive encoded individual video streams or encoded multiplexed video streams from IP KVM device 100. Processor 308 may decode the individual video streams or decode and demux the multiplexed video streams and output each individual video stream to a corresponding display $318_1$ to $318_N$. In one example, IP KVM device 100 implements the method 400 described below with reference to FIGS. 4A-4B.

Figure 4A:
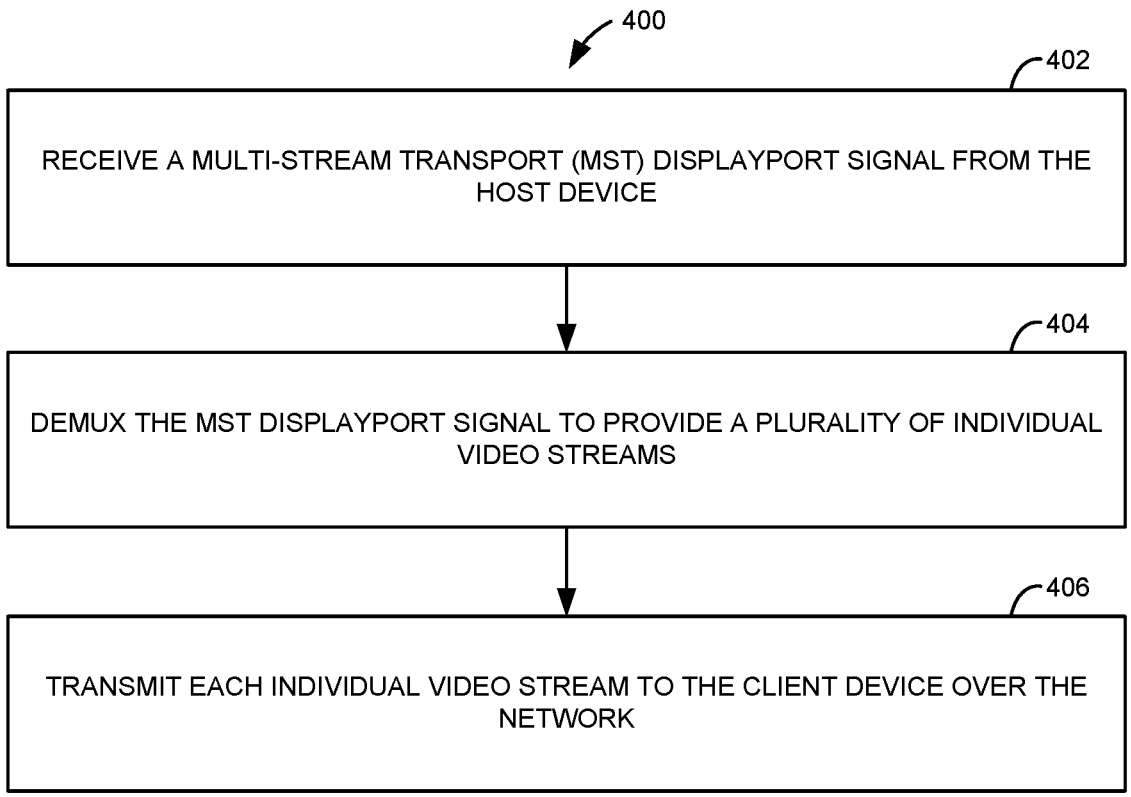
FIGS. 4A-4B are flow diagrams illustrating one example of a method for operating the IP KVM device in the system of FIG. 3.
Figure 4B:
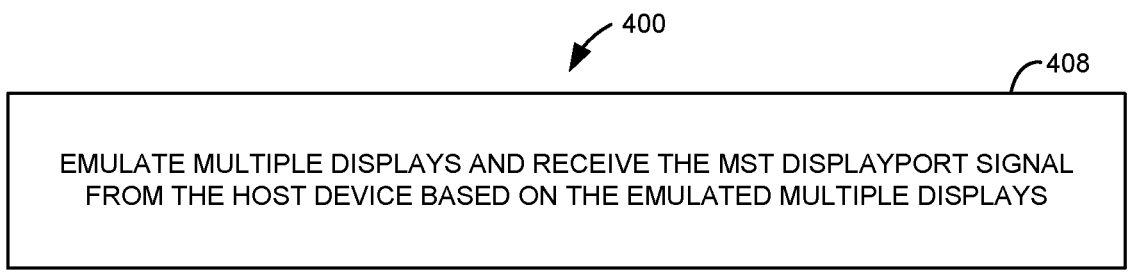

As illustrated in FIG. 4A at 402, IP KVM device 100 may receive a multi-stream transport (MST) DisplayPort signal from the host device 302 (e.g., via display port 104 and processor 108). At 404, IP KVM device 100 may demux the MST DisplayPort signal to provide a plurality of individual video streams (e.g., via processor 108). At 406, IP KVM device 100 may transmit each individual video stream to the client device 306 over the network 304 (e.g., via processor 108 and network port 106). As illustrated in FIG. 4B at 408, IP KVM device 100 may emulate multiple displays (e.g., via processor 108) and receive the MST DisplayPort signal from the host device 302 based on the emulated multiple displays.

In one example, the client device 306 receives each individual video stream and outputs each individual video stream to a corresponding physical display $318_1$ to $318_N$. The IP KVM device 100 may emulate the multiple displays based on display properties of the corresponding physical display $318_1$ to $318_N$ for each individual video stream. To obtain the display properties, the IP KVM device 100 may request the client device 306 transmit the display properties for displays $318_1$ to $318_N$ to the IP KVM device.

Figure 5A:
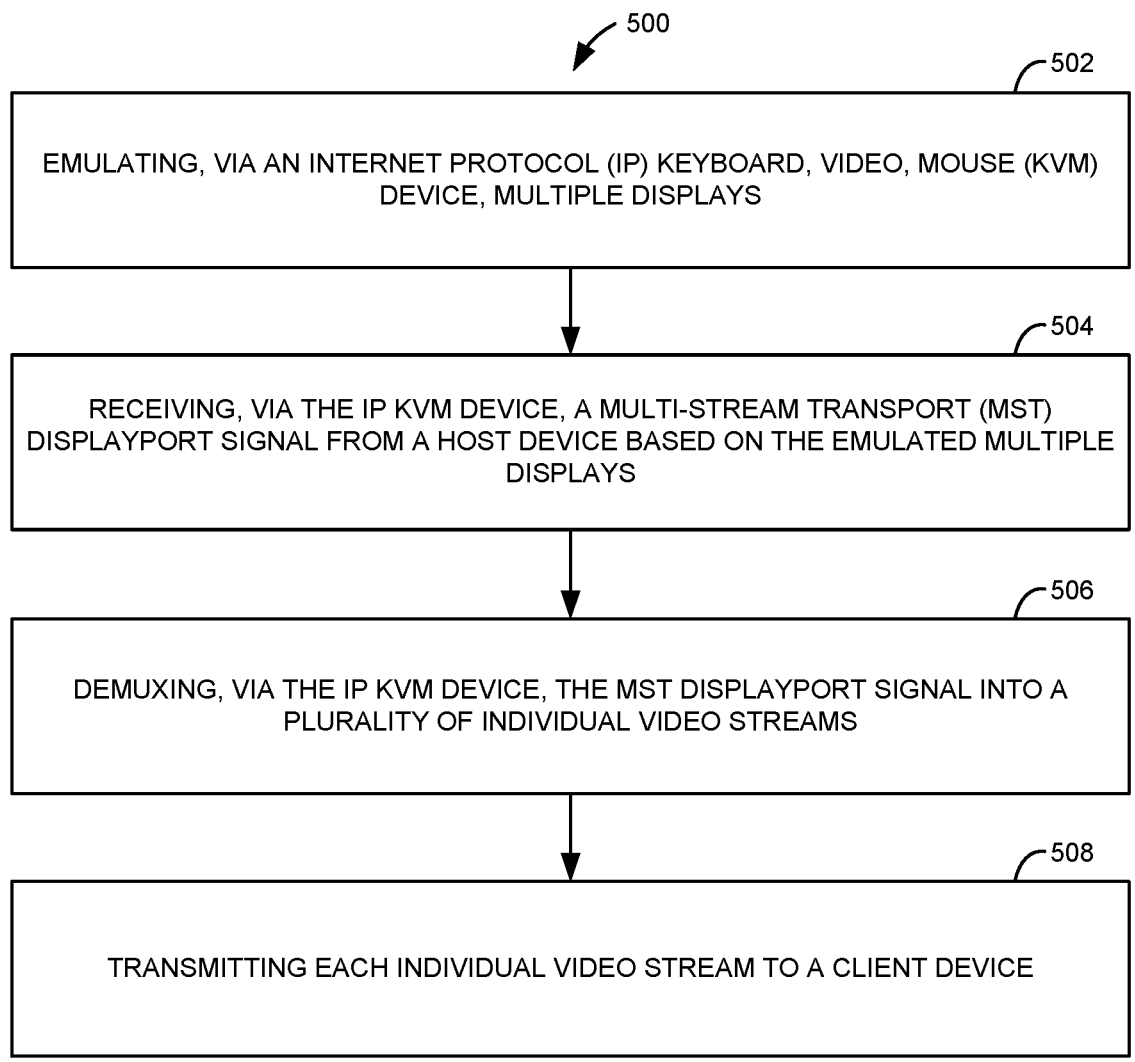
FIGS. 5A-5D are flow diagrams illustrating one example of a method for utilizing a plurality of display devices.

FIGS. 5A-5D are flow diagrams illustrating one example of a method 500 for utilizing a plurality of display devices (e.g., displays $318_1$ to $318_N$). As illustrated in FIG. 5A at 502, method 500 includes emulating, via an internet protocol (IP) keyboard, video, mouse (KVM) device (e.g., IP KVM device 100), multiple displays. At 504, method 500 includes receiving, via the IP KVM device, a multi-stream transport (MST) DisplayPort signal from a host device (e.g., host device 302) based on the emulated multiple displays. At 506, method 500 includes demuxing, via the IP KVM device, the MST DisplayPort signal into a plurality of individual video streams. At 508, method 500 includes transmitting each individual video stream to a client device (e.g., client device 306). In one example, emulating the multiple displays includes emulating the multiple displays based on display properties of physical displays (e.g., displays $318_1$ to $318_N$) communicatively coupled to the client device.

Figure 5B:
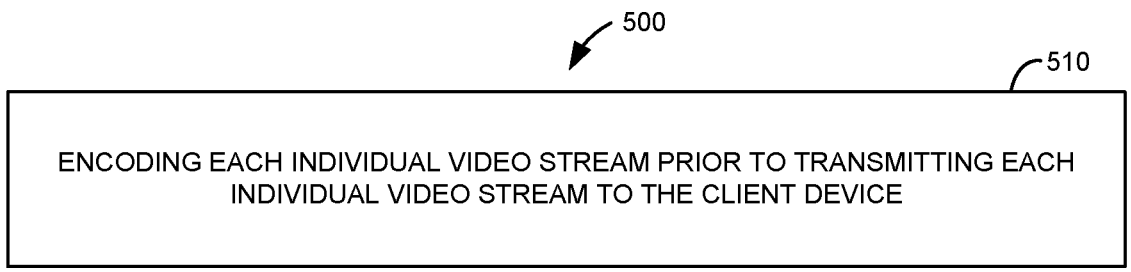
Figure 5C:
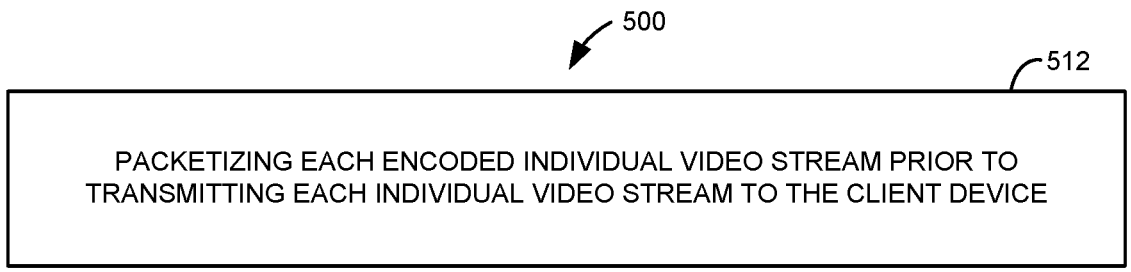
Figure 5D:
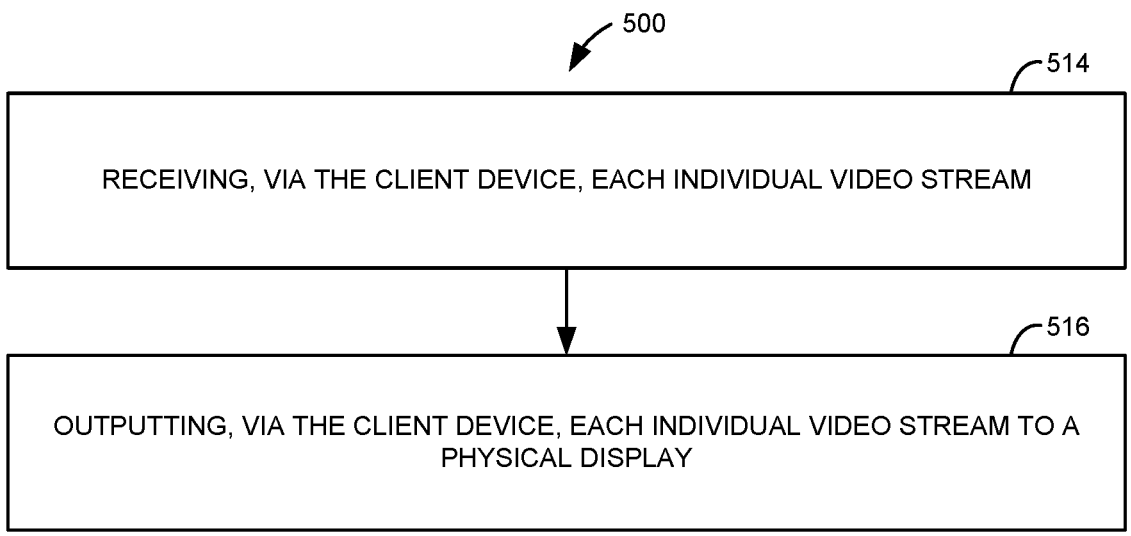

As illustrated in FIG. 5B at 510, method 500 may further include encoding each individual video stream prior to transmitting each individual video stream to the client device. As illustrated in FIG. 5C at 512, method 500 may further include packetizing each encoded individual video stream prior to transmitting each individual video stream to the client device. As illustrated in FIG. 5D at 514, method 500 may further include receiving, via the client device, each individual video stream. At 516, method 500 may further include outputting, via the client device, each individual video stream to a physical display (e.g., a display $318_1$ to $318_N$).

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An internet protocol (IP) keyboard, video, mouse (KVM) device comprising:
 a universal serial bus (USB) port to be communicatively coupled to a host device;
 a display port to be communicatively coupled to the host device;
 a network port to be communicatively coupled to a network; and
 a processor communicatively coupled to the USB port, the display port, and the network port, the processor to:
  emulate a plurality of physical displays based on a display property of each of the plurality of physical displays to obtain a plurality of emulated displays corresponding to the plurality of physical displays, wherein the display property of at least one of the plurality of physical displays differs from the display property of at least one other of the plurality of physical displays;

receive, via the display port, a multi-stream transport (MST) display signal based on the plurality of emulated displays;
demux the MST display signal to provide a plurality of individual video streams; and
output, via the network port, each individual video stream to be displayed on a corresponding physical display of the plurality of physical displays.

2. The IP KVM device of claim 1, wherein the processor is to further:
encode each individual video stream prior to outputting each individual video stream.

3. The IP KVM device of claim 2, wherein the processor is to further:
multiplex the encoded individual video streams prior to outputting each individual video stream.

4. A system comprising:
an internet protocol (IP) keyboard, video, mouse (KVM) device;
a host device communicatively coupled to the IP KVM device;
a network communicatively coupled to the IP KVM device; and
a client device communicatively coupled to the network, wherein the IP KVM device is to:
emulate a plurality of physical displays based on a display property of each of the plurality of physical displays to obtain a plurality of emulated displays corresponding to the plurality of physical displays, wherein the display property of at least one of the plurality of physical displays differs from the display property of at least one other of the plurality of physical displays;
receive a multi-stream transport (MST) display signal from the host device based on the plurality of emulated displays;
demux the MST display signal to provide a plurality of individual video streams; and
transmit each individual video stream to the client device over the network.

5. The system of claim 4, wherein the IP KVM device comprises a processor to receive the MST display signal, demux the MST display signal, and transmit each individual video stream.

6. The system of claim 4, wherein the client device receives each individual video stream and outputs each individual video stream to a corresponding physical display.

7. A method for utilizing a plurality of display devices, the method comprising:
emulating, via an internet protocol (IP) keyboard, video, mouse (KVM) device, a plurality of physical displays based on a display property of each of the plurality of physical displays to obtain a plurality of emulated displays corresponding to the plurality of physical displays, wherein the display property of at least one of the plurality of physical displays differs from the display property of at least one other of the plurality of physical displays;
receiving, via the IP KVM device, a multi-stream transport (MST) display signal from a host device based on the based on the plurality of emulated displays;
demuxing, via the IP KVM device, the MST display signal into a plurality of individual video streams; and
transmitting each individual video stream to a client device.

8. The method of claim 7, further comprising:
encoding each individual video stream prior to transmitting each individual video stream to the client device.

9. The method of claim 8, further comprising:
packetizing each encoded individual video stream prior to transmitting each individual video stream to the client device.

10. The method of claim 7, further comprising:
receiving, via the client device, each individual video stream; and
outputting, via the client device, each individual video stream to a physical display.

11. The IP KVM device of claim 1, wherein the MST display signal comprises a signal that complies with a DisplayPort standard.

* * * * *